(12) United States Patent
Saito

(10) Patent No.: US 6,277,001 B1
(45) Date of Patent: Aug. 21, 2001

(54) METHOD OF CUTTING A LAMINATED WORKPIECE

(75) Inventor: Takahiro Saito, Tokyo (JP)

(73) Assignee: Disco Corporation, Tokyo (JP)

( * ) Notice: Subject to any disclaimer, the term of this patent is extended or adjusted under 35 U.S.C. 154(b) by 0 days.

(21) Appl. No.: 09/517,282

(22) Filed: Mar. 2, 2000

(30) Foreign Application Priority Data

Mar. 4, 1999 (JP) .................................................. 11-056760

(51) Int. Cl.$^7$ .................................................. B24B 17/04
(52) U.S. Cl. .............................. 451/41; 451/6; 125/13.01
(58) Field of Search .............................. 451/6, 5, 41, 57; 125/13.01, 23.01

(56) References Cited

U.S. PATENT DOCUMENTS

| | | | |
|---|---|---|---|
| 4,407,262 | * 10/1983 | Wirz et al. | 125/13.01 |
| 4,688,540 | * 8/1987 | Ono | 125/13.01 |
| 5,692,280 | * 12/1997 | Taniguchi et al. | 29/25.42 |
| 6,102,023 | * 8/2000 | Ishiwata et al. | 125/13.01 |
| 6,142,138 | * 11/2000 | Azuma et al. | 125/13.01 |
| 6,154,356 | * 11/2000 | Kagata et al. | 361/303 |

* cited by examiner

Primary Examiner—Robert A. Rose

(74) Attorney, Agent, or Firm—Arent Fox Kintner Plotkin & Kahn, PLLC

(57) ABSTRACT

Disclosed is an improved method of cutting a laminated workpiece having thin flat strips arranged crosswise at different levels in its thickness. In cutting the laminated workpiece use is made of a cutting machine which comprises a chuck table for holding the laminated workpiece; an optical means for detecting a cutting area in the laminated workpiece; a first cutting means having a blade for cutting a "V"-shaped groove on the laminated workpiece; and a second cutting means having a blade for cutting the cutting area into square pieces. The chuck table is capable of moving for cutting the laminated workpiece, and capable of rotating a selected angular distance for cutting indentation. The method comprises at least the steps of: holding fixedly the laminated workpiece on the chuck table; cutting first and second "V"-shaped grooves in the vicinities of at least one set of opposite sides of the laminated workpiece with the first cutting means, thus exposing the ends of the flat thin strips on the "V"-shaped groove surfaces; taking pictures of the first and second "V"-shaped grooves with the optical means to detect the ends of the thin flat strips on the "V"-shaped groove surfaces; putting each line connecting from each strip end exposed in one "V"-shaped groove to the corresponding strip end on the other "V"-shaped groove in parallel-alignment with the cutting direction; determining the strip-to-strip interval from the exposed strip ends; and cutting the strip-to-strip space with the second cutting means.

7 Claims, 5 Drawing Sheets

31a (32a)

33a (34a)

METHOD OF CUTTING A LAMINATED WORKPIECE

BACKGROUND OF THE INVENTION

1. Field of the Invention

The present invention relates to a method of cutting into square pieces a laminated workpiece having thin flat strips crosswise arranged at different levels in its thickness. Such a laminated workpiece, however, has no lattice pattern visible on its upper surface. One example of such a square piece is a laminated ceramic condenser.

2. Related Arts

Optical means is used to determine the strip-to-strip interval from the strip ends exposed on one selected side of a laminated workpiece, and the crosswise sections are presumably determined from the so determined strip-to-strip interval. This necessitates use of complicated optical means, and cannot be applied to a laminated object having no strip ends appearing on its sides.

In cutting such a laminated object having no strip ends exposed on its sides one or more "V"-shaped grooves are cut on the upper surface of the laminated object to expose the strip ends on the inclined surfaces of the "V"-shaped groove, thus permitting determination of the strip-to-strip interval for determining the crosswise cutting sections.

This, however, necessitates use of two different cutting machines for cutting "V"-shaped grooves and for cutting a laminated object into square pieces, and transportation means for transporting "V"-grooved workpieces from the grooving machine to the cutting machine. This causes extra expense and labor in cutting laminated workpieces.

Still disadvantageously, transportation from the grooving machine to the cutting machine requires reorientation of the grooved workpiece relative to the cutting blade in the cutting machine. Accordingly the workability is lowered.

SUMMARY OF THE INVENTION

One object of the present invention is to provide a method of cutting into square pieces a laminated workpiece having thin flat strips crosswise arranged at different levels in its thickness with an increased efficiency.

To attain this object a method of cutting a laminated workpiece having thin flat strips arranged crosswise at different levels in its thickness with a cutting machine comprising at least a chuck table for holding the laminated workpiece, the chuck table being capable of moving for cutting the laminated workpiece, and capable of rotating a selected angular distance for indentation; an optical means for detecting a cutting area in the laminated workpiece held on the chuck table; a first cutting means having a blade for cutting a "V"-shaped groove on the laminated workpiece held on the chuck table; and a second cutting means having a blade for cutting the cutting area, characterized in that it comprises at least the steps of:

(a) holding fixedly the laminated workpiece on the chuck table;

(b) cutting first and second "V"-shaped grooves in the vicinities of at least one set of opposite sides of the laminated workpiece with the first cutting means, thus exposing the ends of the flat thin strips on the inclined surfaces of the "V"-shaped grooves;

(c) taking pictures of the first and second "V"-shaped grooves with the optical means to detect the ends of the thin flat strips on the inclined surfaces of the "V"-shaped grooves;

(d) putting each line connecting from each strip end exposed in one "V"-shaped groove to the corresponding strip end on the other "V"-shaped groove in parallel-alignment with the cutting direction;

(e) determining the strip-to-strip interval from the exposed strip ends; and (f) cutting the intermediate line of the strip-to-strip space with the second cutting means.

Advantageously the laminated workpiece is allowed to remain on the chuck table while being subjected to grooving and cutting, thus not requiring the reorientation of the grooved workpiece, which otherwise, would be required.

The laminated workpiece may be rectangular in shape, having two sets of opposite sides, the steps (a) to (f) being effected on the laminated workpiece in the direction traversing from one to the other side of each set of opposite sides.

The second cutting means may be so controlled that the blade of the second cutting means may not cut the border round the "V"-shaped grooves, thereby leaving the surrounding frame-like border as a whole to be thrown away.

The step (d) may include storing pieces of alignment information pertaining to the parallel-alignments relative to the cutting direction of all strips having their ends exposed in the "V"-shaped grooves; and the step (e) may include storing pieces of the strip-to-strip intervals of all strips having their ends exposed in the "V"-shaped grooves, whereby all strip-to-strip spaces may be cut individually with the second cutting means by referring to the so stored pieces of information pertaining to the parallel-alignments and strip-to-strip intervals.

The laminated workpiece may have indices marked on its top surface, such indices being detected with the optical means prior to the cutting of "V"-shaped grooves.

Use may be made of air blower means placed between the cutting means and the optical means or below the optical means to direct the blowing air to the "V"-shaped grooves after being made and before orienting the laminated workpiece relative to the cutting direction.

The optical means may comprise at least a light source-and-light projecting system, a picture-taking unit comprising a plurality of pixels arranged in matrix, analog-to-digital converter and an image processing means for effecting image-processing on digital signals; and required alignments are effected by processing according to the pattern matching in the step (c), the images of the workpiece shape and the exposed strip ends taken by the optical means.

Other objects and advantages of the present invention will be understood from the following description of the method of cutting laminated objects according to the present invention, which is illustrated in the accompanying drawings.

DETAILED DESCRIPTION OF PREFERRED EMBODIMENT

Figure 1:
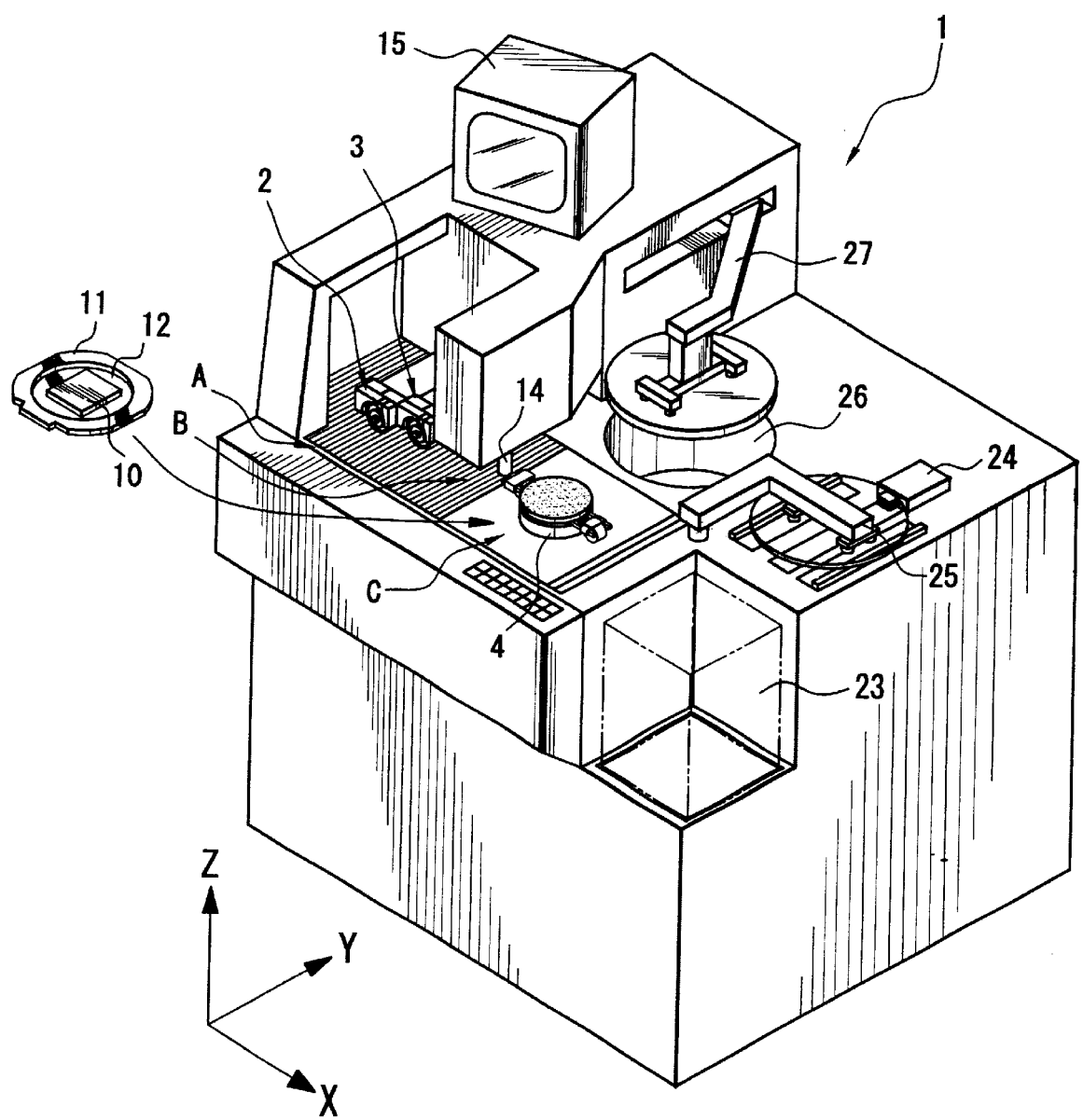
FIG. 1 is a perspective view of a grooving-and-cutting machine, which can be used in cutting laminated workpieces according to the present invention.

Referring to FIG. 1, a cutting machine 1 comprises a chuck table 4 for holding fixedly a laminated workpiece 10, an optical means 14 for detecting the cutting area in the laminated workpiece 10 fixedly held on the chuck table 4; a first cutting means 2 having a blade for cutting a "V"-shaped groove on the laminated workpiece 10 fixedly held on the chuck table 4; and a second cutting means 3 having a blade for cutting slits or narrow cuts in the cutting area, thus dividing the cutting area into square pieces. The first and second cutting means 2 and 3 can be moved in the Y-axial direction, and can be raised and lowered in the Z-axial direction. These movements can be controlled with precision. The chuck table 4 can be moved in the X-axial direction, and can be rotated an incremental angular distance for aligning indentation.

Figure 2:
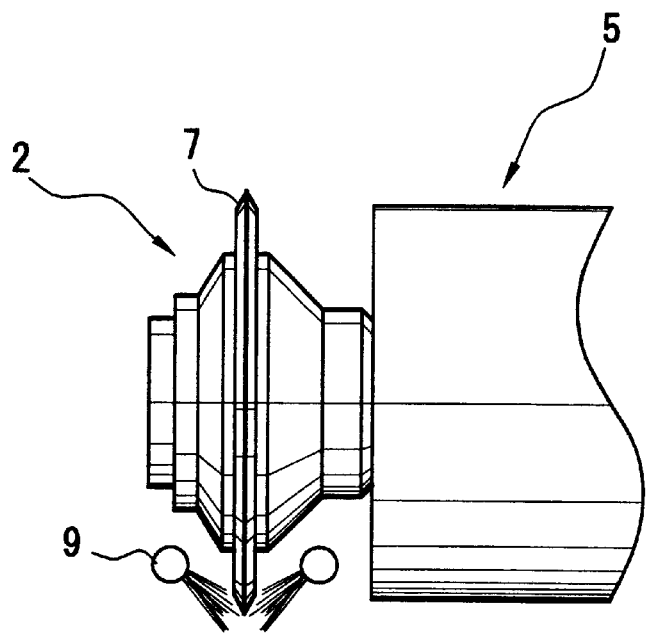
FIG. 2 is a side view of a first cutting means for making "V"-shaped grooves on a selected laminated workpiece.
Figure 3:
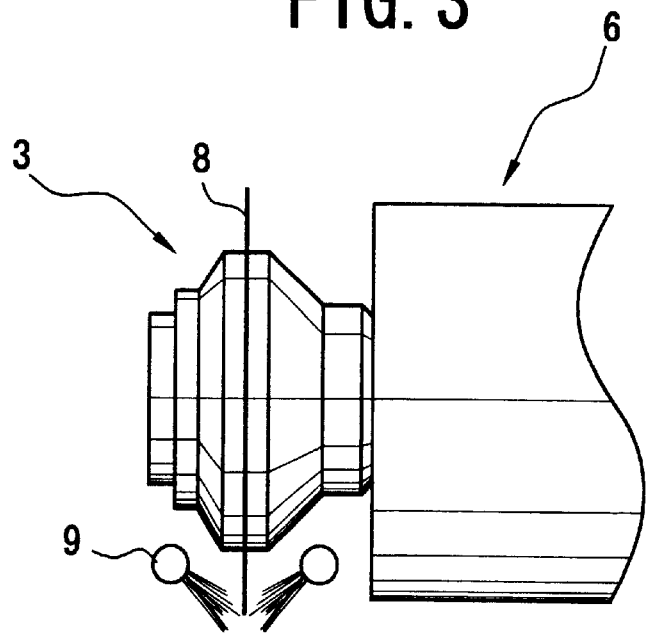
FIG. 3 is a side view of a second cutting means for cutting a grooved workpiece.

Referring to FIGS. 2 and 3, each of the first and second cutting means 2 and 3 comprises a spindle unit 5 or 6 having a cutting blade 7 or 8 attached to its end and water flushing means 9 placed close to the blade 7 or 8. These spindle units 5 and 6 are positioned close to the cutting area "A". The rotary chuck table can be rotated 360 degrees, and can be moved from the cutting area "A" to the alignment area "B" or the loading area "C" as seen from FIG. 1.

As seen from FIGS. 2 and 3, the cutting blade 7 of the first cutting means 2 is relatively thick, and its edge has a "V"-shape for cutting "V"-shaped grooves on a workpiece 10 whereas the cutting blade 8 of the second cutting means 3 is relatively thin, and its leaf edge is appropriate for cutting slits or narrow cuts in a workpiece, thus dividing it into square pieces with precision.

The workpiece 10 is a laminated object having thin flat strips arranged crosswise at different levels in its thickness, and when cut into square pieces, a plurality of laminated ceramic condensers or the like are provided. Such a laminated object 10 is attached to an appropriate frame-like carrier 11 with an adhesive tape 12 so that it may be fixedly held on the chuck table 4.

Figure 4:
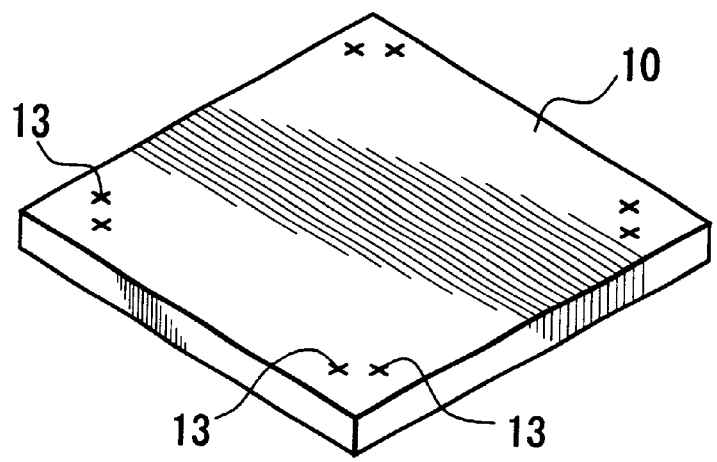
FIG. 4 is a perspective view of a laminated workpiece to be cut.

The laminated object has the crosswise strip pattern invisible on its top surface, and therefore, it is necessary that cutting marking be formed on the top surface of the laminated object. To presume how the crosswise strip (electrode) arrangements are laid at different levels within the laminated object two or more "V"-shaped grooves are made in the vicinities of opposite sides of the laminated object to expose the strip ends on the slopes of each "V"-shaped groove, and then, the intermediate line each of the strip-to-strip spaces is determined to be cut in cutting the laminated object 10. Referring to FIG. 4, the top surface of the laminated object 10 is marked Xs at its corners to indicate where "V"-shaped grooves are to be made.

Figure 5:
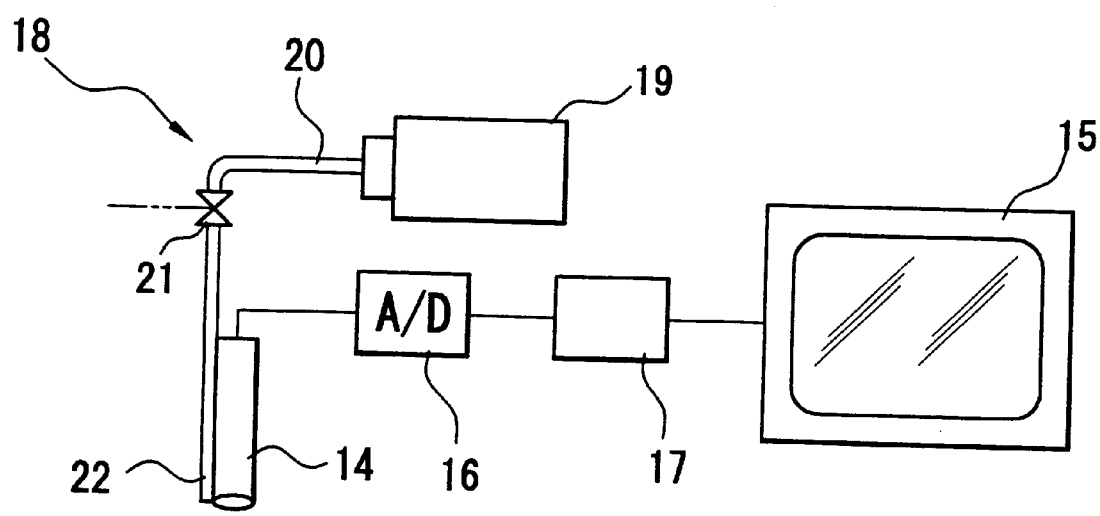
FIG. 5 illustrates picture-taking means, image processing means and air blowing means.

Referring to FIG. 5, the optical means is provided for detecting the cutting area on the top surface of a selected laminated object 10 in the alignment area "B". It comprises a light source for throwing a beam of light, a picture-taking means 14 having numerous pixels arranged in lattice pattern, such as a CCD camera and an image processing means 15 permitting the pictures taken by the camera to be processed while being displayed. Analog signals are directed from the picture-taking means 14 to an associated analog-to-digital converter means 16, and then, the digital signals thus converted are directed to the image processing means 15 via an associated amplifier 17. The image processing means 15 includes memory means, arithmetic operation means and control means, thereby controlling the whole operation of the cutting machine 1 and at the same time, storing pieces of information provided by the picture-taking means 14, on the basis of which pieces of information the chuck table 4 and the first and second cutting means 2 and 3 are controlled.

Air blowing means 18 are positioned close to the picture-taking means 14 in the alignment area "B". One example of the air blowing means 18 comprises an air storage 19 and an air passage 20 extending from the air storage 19. An electromagnet valve 21 is installed on the way to the air nozzle 22, which may be a slit to form an air curtain.

A lot of laminated objects 10 each attached to a carrier 11 are stored in a casing 23, and the casing 23 thus loaded with laminated objects 10 is put in a recess made in the vicinity of the loading area "C" in the cutting machine 1. Taking-in and out means 24 and transporting arm means 25 are located close to the casing 23, thus permitting the taking-in and out means 24 and transporting arm means 25 to take out and transport a selected laminated object 10 from the casing 23 to the chuck table 4 in the loading area "C". When the laminated object 10 is diced, picking-up and transporting arm means 27 transports the so diced workpiece from the chuck table 4 to the washing section 26. The structure described so far is found in an ordinary cutting machine 10.

Now, the manner in which a selected laminated object is diced with such a cutting machine is described below.

First, a selected laminated object 10 is taken out of the casing 23 to be put on the chuck table 4 with the transporting arm means 25, and then, a negative pressure is applied to the laminated object 10 to be fixedly held on the chuck table 4. The chuck table 4 is moved to the alignment area "B" to permit the picture-taking means 14 to take a picture of the laminated object 10, thus detecting the marks of X 13 to put the laminated object 10 in correct position for making "V"-shaped grooves.

Then, the chuck table 4 is moved to the cutting area "A", where the first and second "V"-shaped grooves 31a and 31b are cut in the vicinities of one set of the opposite sides of the laminated workpiece with the first cutting means 2 while flushing water from the water flushing means 9. Thus, the ends of the flat thin strips are exposed on the slopes of the "V"-shaped grooves. Thereafter, the chuck table 4 is made to turn 90 degrees so that the third and fourth "V"-shaped grooves 32a and 32b may be cut in the vicinities of the other set of opposite sides of the laminated workpiece with the first cutting means 2 while flushing water from the water flushing means 9.

Figure 6:
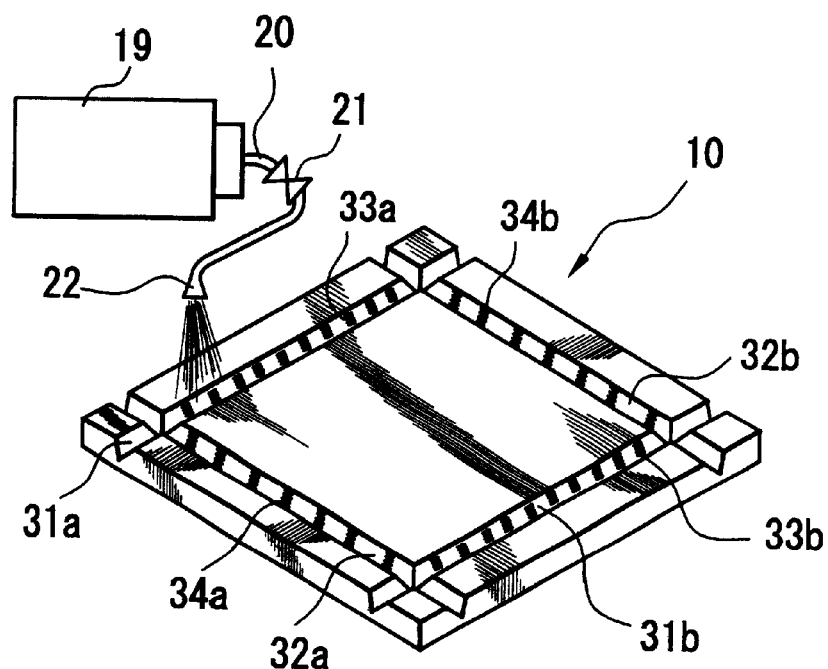
FIG. 6 is a perspective view of a laminated workpiece having "V"-shaped grooves cut on its upper surface.
Figure 7:
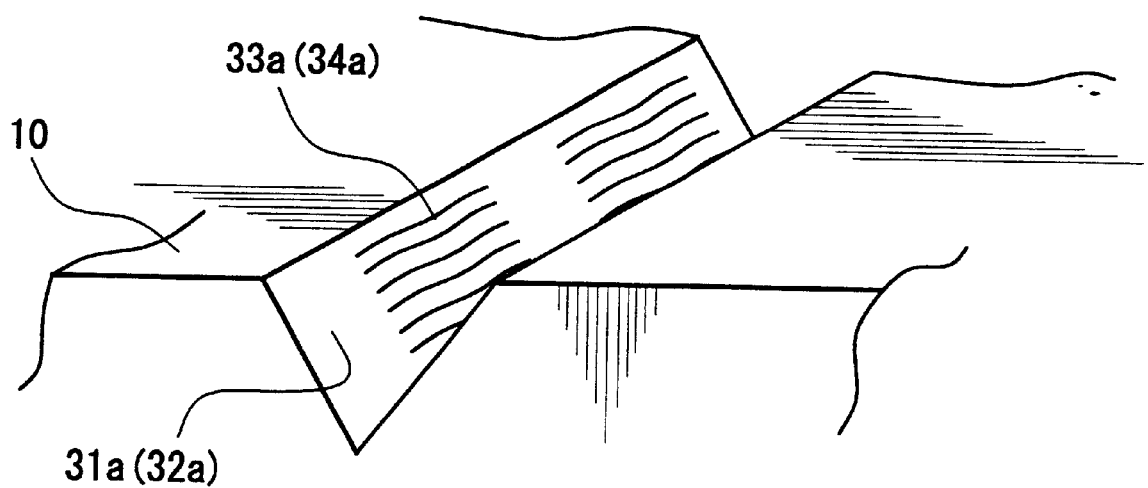
FIG. 7 is an enlarged perspective view of a fragment of the "V"-shaped groove.
Figure 8:
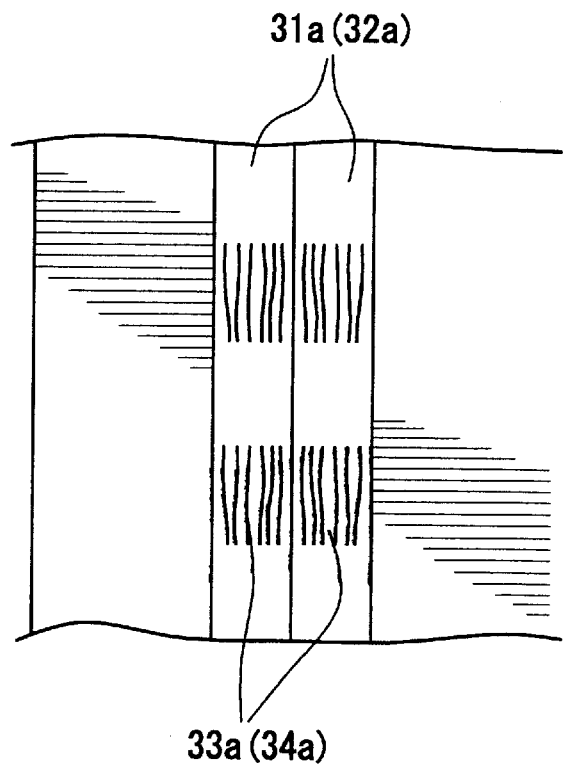
FIG. 8 is an enlarged plane view of a fragment of the "V"-shaped groove.

Thus, the first and second "V"-shaped grooves 31a, 31b and the third and fourth "V"-shaped grooves 32a, 32b are formed on the top surface of the laminated object 10 (see FIG. 6), so that the strip ends 33a, 33b, 34a, 34b are exposed on the slopes of these "V"-shaped grooves, as seen from FIGS. 7 and 8.

It, however, suffices that each "V"-shaped groove is cut deep enough to allow strip ends to appear in the groove, permitting determination of the lateral strip-to-strip interval by sight. It should be noted that the strips 33a, 33b whose ends appear in the first and second "V"-shaped grooves 31a and 31b traverse the strips 34a, 34b whose ends appear in the third and fourth "V"-shaped grooves 32a and 32b within the laminated object 10.

To cut the laminated object 10 into square pieces each having crosswise strip sections at its center it is necessary to determine the cutting lines as being intermediate of adjacent crosswise strips 33a, 33b and 34a, 34b. For the purpose the chuck table 4 is made to return to the alignment area "B", where the picture-taking means 14 takes a picture of the "V"-grooved workpiece 10 to permit orientation of the same for cutting by referring to the exposed strip ends, which are detected in the picture. Specifically each line connecting from each strip end exposed in one "V"-shaped groove to the corresponding strip end on the other "V"-shaped groove is put in parallel-alignment with the cutting direction.

The required alignment cannot be obtained if water drops and debris remain in the "V"-shaped grooves 31a, 31b and 32a, 32b. Such water drops and debris can be removed when the electromagnetic valve 21 is opened to direct the blowing air from the duct 22 to the "V"-shaped grooves 31a, 31b and 32a, 32b.

In effecting the required alignment for cutting, first, the picture-taking means 14 is used at its macro-magnification to establish the macro-alignment on the whole surface of the laminated object 10. Specifically, the picture taken by the picture-taking means 14 is compared with the reference pattern, which is stored in the image processing means 15. Then, the angular position of the "V"-grooved workpiece 10 relative to the chuck table 4 and the angular positional relation between the "V"-shaped grooves and the "V"-grooved workpiece are determined according to the pattern-matching processing. Then, the data thus obtained are stored in the memory of the image processing means 15.

Then, the picture-taking means 14 is used at a micro-magnification so that the micro-alignment is established in terms of the strip ends 31a, 31b and 32a, 32b, which are exposed in the slopes of the "V"-shaped grooves 31a, 31b and 32a, 32b. First, a picture is taken of the strip ends 33a appearing in the slopes of the "V"-shaped groove 31a to determine the coordinates of each strip end. Then, the chuck table 4 is moved in the X-axial direction to take a picture of the strip ends 33b appearing in the opposite "V"-shaped groove 31b, and the coordinates of each strip end is determined. From these coordinates the angular deviation of the workpiece relative to the cutting direction can be calculated in terms of Y-coordinates. The data thus obtained are stored in the memory of the image-processing means 15.

The lateral strip-to-strip interval is determined from adjacent strip ends 33a appearing in the slopes of the first "V"-shaped groove 31a, and from adjacent strip ends 33b appearing in the slopes of the second "V"-shaped groove 31b. The data thus obtained are stored in the memory of the image-processing means 15. The above proceeding is repeated on each and every strip ends 33a, 33b, 34a, 34b, and then, all alignment data are stored in the memory of the image-processing means 15.

After the alignment data has been collected in respect of the first and second "V"-shaped grooves 33a and 33b, the chuck table 4 is made to rotate 90 degrees to effect the same proceedings on the strip ends 34a and 34b, which are exposed in the third and fourth "V"-shaped grooves 32a and 32b. The alignment data are obtained and stored in the memory of the image processing means 15. The alignment data of all strip ends 33a, 33b and 34a, 34b need to be obtained because it is not assured that all thin flat strips be strictly parallel with each other.

If the strict parallelism is assured, it suffices that angular adjustment be determined relative to one of the opposite "V"-shaped grooves of each set, for example, the strip ends 33a in the first "V"-shaped groove 31a of one set and the strip ends 34a in the third "V"-shaped groove 32a of the other set.

From the alignment data both of the whole laminated body 10 and each and every strip end appearing in the "V"-shaped grooves 31a, 31b and 32a, 32b the arithmetic section of the image processing means 15 determines the cutting start point and cutting line indentations for respective strips 33a, 33b and 34a, 34b. At the subsequent step the cutting is effected with the second cutting means 3.

The chuck table 4 is made to move to the cutting area "A", where the thin blade 8 is used to cut a narrow slit 35 along each cutting line extending from the first "V"-shaped groove 31a to the second "V"-shaped groove 31b by referring to the cutting start points and cutting indentations. Then, the chuck table 4 is made to rotate 90 degrees to cut a second slit 36 along each cutting line extending from the first "V"-shaped groove 32a to the second "V"-shaped groove 32b. While cutting such slits in the laminated object water is flushed to the cutting blade 8.

Figure 9:
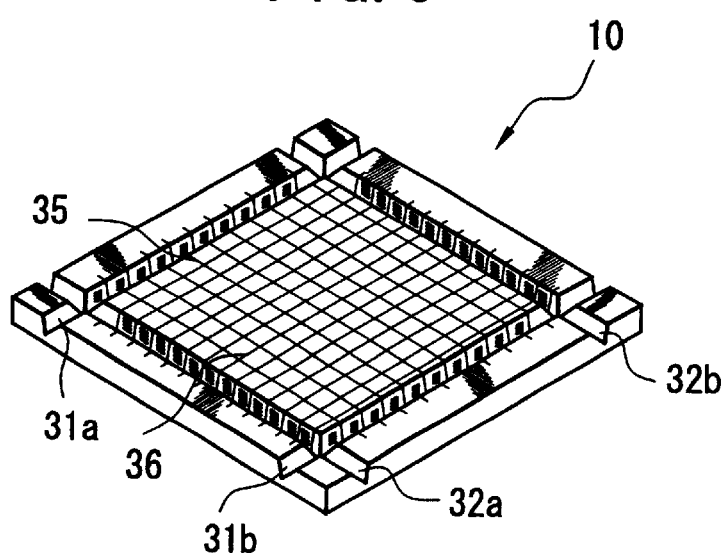
FIG. 9 is a perspective view of a cut workpiece.

FIG. 9 shows the laminated object 10 having its major plane sectioned with crosswise slits or narrow cuts 35 and 36, each slit being deep enough to reach the bottom of the laminated object 10. Removal of all square pieces from the laminated object 10 will leave the surrounding frame-like part, which is defined with the four "V"-shaped grooves 31a, 31b, 32a and 32b. The tape 12 is peeled off from the frame-like part, which can be thrown away as a whole. The "V"-shaped grooves reach short of the bottom of the workpiece 10 to leave the remaining as an integral form, which facilitates its disposal.

When the chuck table 4 returns to the loading area "C" after cutting, the diced workpiece is picked up and transported to the washing section 26, where the diced workpiece is washed. Then, the diced workpiece is transported to the initial taking-out place, from which it is taken in the casing 23 with the taking-in and out means 24. For the while another selected workpiece is taken out of the casing 23; put on the chuck table 4; and is subjected to first aligning, "V"-shaped groove cutting, second aligning and cutting in the order named.

As is apparent from the above laminated workpieces can be cut at an increased efficiency, using a single cutting machine and smoothly carrying out a series of steps beginning with the cutting of "V"-shaped grooves and ending with cutting, requiring neither transportation of workpieces from machine to machine nor realignment of workpieces relative to the subsequent cutting machine.

What is claimed is:

1. Method of cutting a laminated workpiece having thin flat strips arranged crosswise in its thickness at different levels with a cutting machine comprising at least a chuck table for holding the laminated workpiece, the chuck table being capable of moving for cutting the laminated workpiece, and capable of rotating a selected angular distance for indentation; an optical means for detecting a cutting area in the laminated workpiece held on the chuck table; a first cutting means having a blade for cutting a "V"-shaped groove on the laminated workpiece held on the chuck table; and a second cutting means having a blade for cutting the cutting area, characterized in that it comprises at least the steps of:

(a) holding fixedly the laminated workpiece on the chuck table;

(b) cutting first and second "V"-shaped grooves in the vicinities of at least one set of opposite sides of the laminated workpiece with the first cutting means, thus exposing the ends of the flat thin strips on the inclined surfaces of the "V"-shaped grooves;

(c) taking pictures of the first and second "V"-shaped grooves with the optical means to detect the ends of the thin flat strips on the inclined surfaces of the "V"-shaped grooves;

(d) putting each line connecting from each strip end exposed in one "V"-shaped groove to the corresponding strip end on the other "V"-shaped groove in parallel-alignment with the cutting direction;

(e) determining the strip-to-strip interval from the exposed strip ends; and (f) cutting the intermediate line of the strip-to-strip space with the second cutting means.

2. Method of cutting a laminated workpiece according to claim 1, wherein the laminated workpiece is rectangular in shape, having two sets of opposite sides, the steps (a) to (f) being effected on the laminated workpiece in the direction traversing from one to the other side of each set of opposite sides.

3. Method of cutting a laminated workpiece according to claim 2, wherein the second cutting means is so controlled that the blade of the second cutting means may not cut the border round the "V"-shaped grooves, thereby leaving the surrounding frame-like border as a whole to be thrown away.

4. Method of cutting a laminated workpiece according to claim 2, wherein the step (d) includes storing pieces of alignment information pertaining to the parallel-alignments relative to the cutting direction of all strips having their ends exposed in the "V"-shaped grooves; and the step (e) includes storing pieces of the strip-to-strip intervals of all strips having their ends exposed in the "V"-shaped grooves, whereby all strip-to-strip spaces may be cut individually with the second cutting means by referring to the so stored pieces of information pertaining to the parallel-alignments and strip-to-strip intervals.

5. Method of cutting a laminated workpiece according to claim 2, wherein the laminated workpiece has indices marked on its top surface, such indices being detected with the optical means prior to the cutting of "V"-shaped grooves.

6. Method of cutting a laminated workpiece according to claim 2, wherein use is made of air blower means placed between the cutting means and the optical means or below the optical means to direct the blowing air to the "V"-shaped grooves after being made and before orienting the laminated workpiece relative to the cutting direction.

7. Method of cutting a laminated workpiece according to claim 1, wherein the optical means comprises at least a light source-and-light projecting system, a picture-taking unit comprising a plurality of pixels arranged in matrix, analog-to-digital converter and an image processing means for effecting image-processing on digital signals; and required alignments are effected by processing according to the pattern matching in the step (c), the images of the workpiece shape and the exposed strip ends taken by the optical means.

* * * * *